United States Patent Office 3,361,440
Patented Jan. 2, 1968

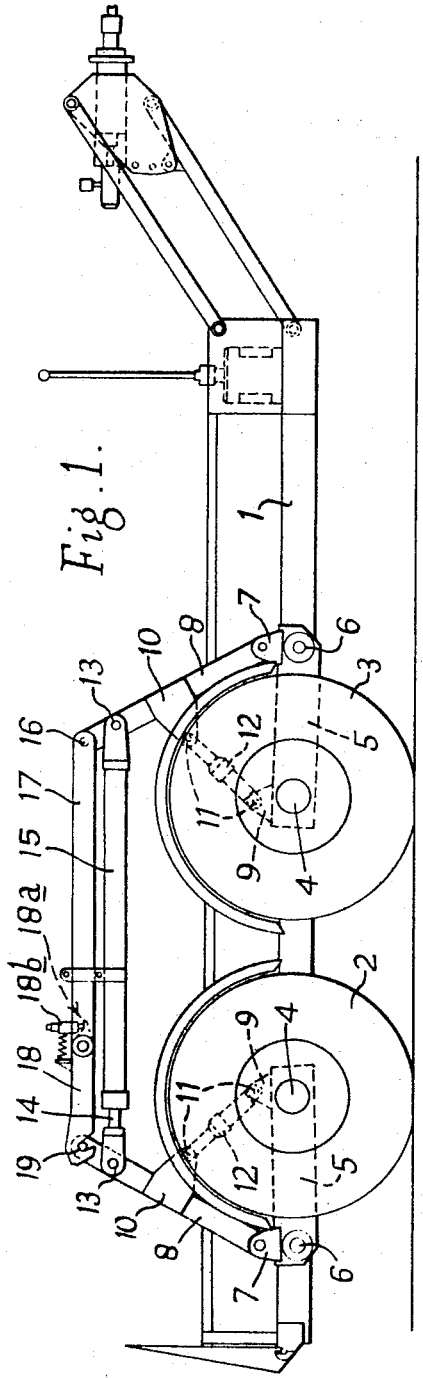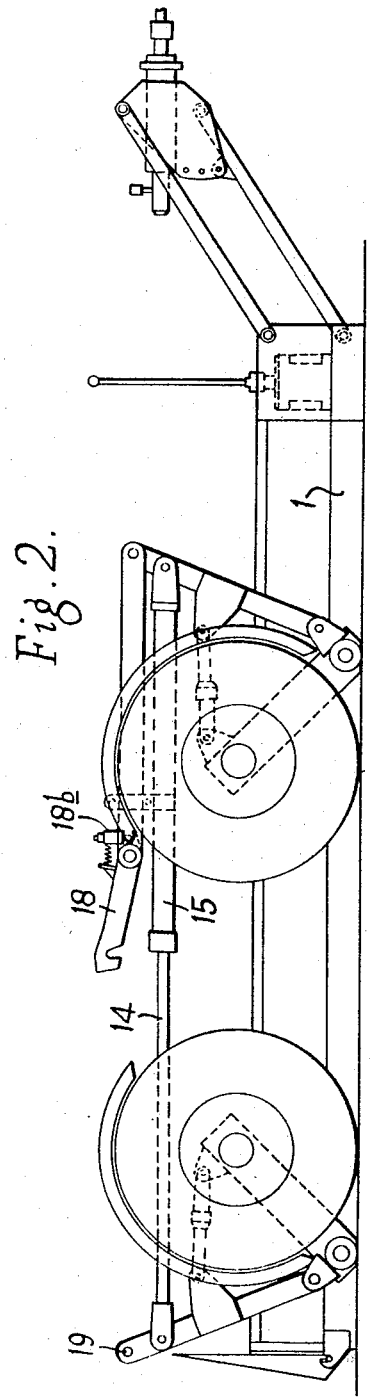

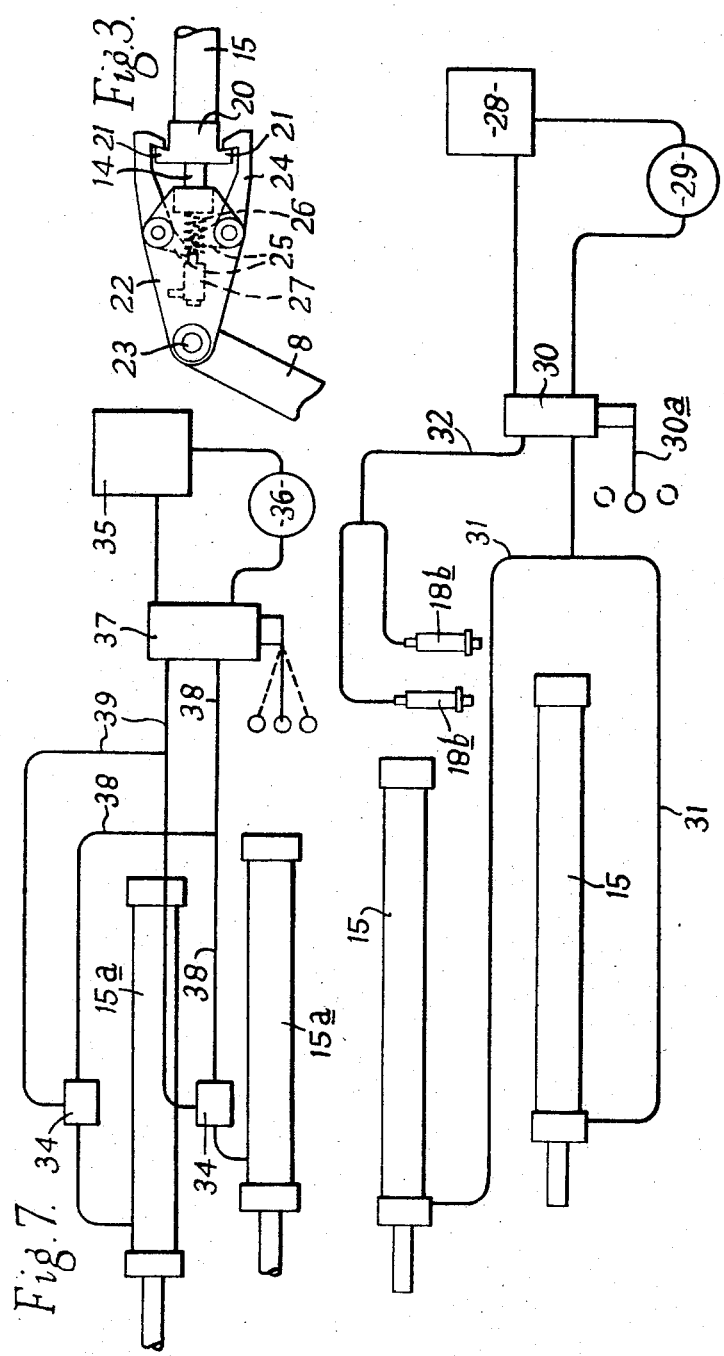

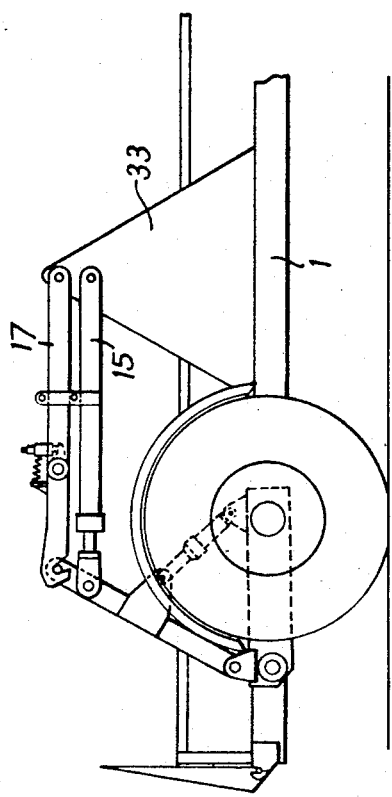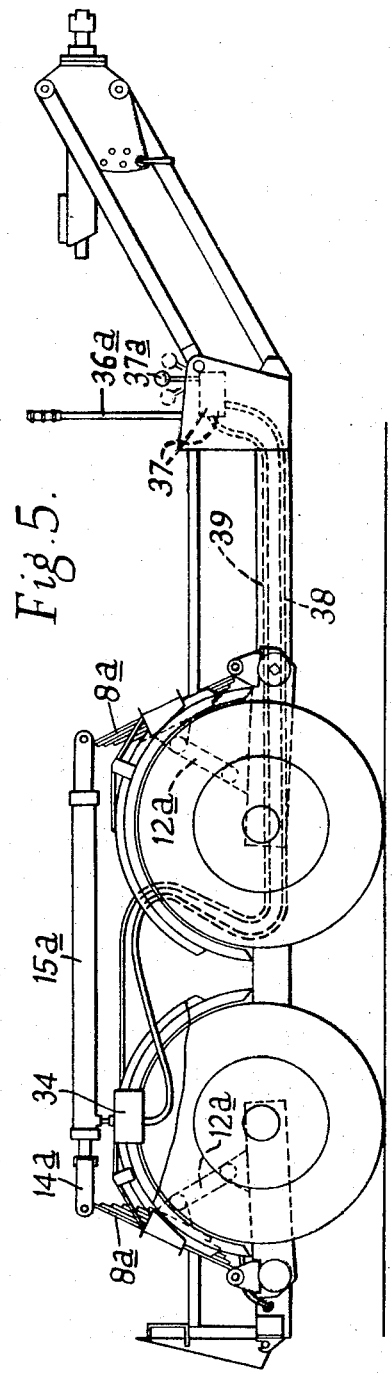

3,361,440
RETRACTIBLE SUSPENSIONS FOR VEHICLE
WHEELS
Maurice Raymond Green, 5 Church Ave.,
Ampthill, Bedfordshire, England
Filed Feb. 23, 1966, Ser. No. 529,337
Claims priority, application Great Britain, Feb. 26, 1965,
8,369/65
9 Claims. (Cl. 280—43.18)

This invention relates to retractible suspensions for the wheels of vehicles, and in particular for towed vehicles such as trailers, semi-trailers, articulated trailers, caravans and the like, or for powered vehicles having front wheel drive.

The object of the invention is to provide an improved construction of suspension permitting the obtaining of hydraulically controlled lifting and lowering of a load-bearing platform between a raised working position and a lowered position at, for example, ground level.

According to the present invention a vehicle suspension comprises a wheel arm extending longitudinally of the vehicle and pivoted at one end thereto for vertical movement about a transverse axis, a wheel journal at the other end of the wheel arm, a lever integral with or coupled to the wheel arm, and power-operable shifting means interconnecting said lever and an anchor point.

In order to permit springing to be introduced into the wheel arm and lever assembly, it is preferred to have the lever either coupled to the wheel arm by a resiliently deformable link or itself made resiliently deformable along its length. In the latter case the lever may be coupled to the wheel arm by a rigid link.

If the anchor point is made to be some fixed part of the structure of the vehicle, the arrangement as so far described will provide a suspension for a single wheel, and the arrangement may be repeated identically at each side of the vehicle.

Where it is desired to have two wheels in tandem, two wheel arms at the same side may be each pivoted at one end to the vehicle for movement about respective transverse axes and extending in opposite directions longitudinally of the vehicle. Two levers are provided, each one being associated with a respective wheel arm, and the shifting means interconnects said levers so that each lever acts as an anchor point in relation to the other lever.

Conveniently the power-operable shifting means is in the form of a hydraulic ram, e.g. having its piston coupled to a or the lever, and its cylinder coupled to the other lever or to an anchor point, as the case may be. Such a ram may be fed with hydraulic fluid under pressure to operate it.

The counter-thrust exerted by the ground on the load-bearing wheel or wheels tends to pivot the wheel arm or arms upwardly with respect to their points of pivoting to the vehicle, and this thrust is transferred to the associated lever or levers and tends to cause them to move away from the anchor point or each other, as the case may be. This tendency may, if desired, be resisted solely by the shifting means, e.g. the ram, but it is preferred to provide means for locking the lever or levers in the position in which the vehicle is raised. Such locking means may comprise a linking arm mounted on the or a lever and capable of engagement with the anchor point, or the other lever. By way of example, such a linking arm may include a latch which may be spring-loaded into latching position and which may be hydraulically shiftable out of latching position.

In another form, and when the shifting means is a ram, the locking means comprises a hermetically closable valve in the hydraulic circuit of the ram, and said valve may itself be hydraulically operable.

Where two such suspensions are provided for wheels in tandem, whenever an above-average thrust is exerted on one of the tandem wheels, e.g. as it passes over a bump and suffers increased loading, the upward movement incurred is transferred via the levers and shifting means to the other wheel and in the direction to urge that other wheel downwardly into greater pressure against the ground and thereby increase its loading. The arrangement accordingly always tends to equalize the loading of the two wheels in tandem.

Where rams are used, as shifting means, such rams for each side of the vehicle are preferably provided with common controls so that the vehicle may be lifted and lowered symmetrically. Lowering may be obtained by the weight of the vehicle under gravity, by allowing the ram to exhaust. The hydraulic system may incorporate a common control which also serves for control of the latching means.

In order to permit a vehicle incorporating the suspension means to be coupled to towing vehicles having their towing hooks at different levels, the vehicle may be advantageously provided with a towing coupling incorporating vertically shiftable parallelogram arms, and means for retention of such arms in a desired position of use. When lifting and lowering the vehicle, the retention means are disengaged, and the parallelogram allowed to deform as necessary.

In order that the nature of the invention may be readily ascertained, three embodiments of ground level loading trailer in accordance therewith are hereinafter particularly described with reference to the accompanying drawings, wherein:

FIG. 1 is a side elevation of a first embodiment seen in raised position;

FIG. 2 is a side elevation of the same embodiment seen in lowered position;

FIG. 3 is a partial elevation, to a larger scale, to show a modified form of locking means;

FIG. 4 is a side elevation of a second embodiment, seen in raised position;

FIG. 5 is a side elevation of a third embodiment, seen in raised position;

FIG. 6 is a schematic view of a hydraulic circuit for the operating rams of the embodiment of FIG. 1;

FIG. 7 is a schematic view of a hydraulic circuit for the operating rams of the embodiment of FIG. 5.

Referring to FIG. 1, a trailer comprises a flat platform chassis 1 having at each side an identical suspension system incorporating two wheels 2, 3, spaced longitudinally of the trailer. Each wheel is carried on a respective journal 4 mounted at one end of a wheel arm 5 which is pivotably mounted at its other end on a bearing 6 on the trailer chassis. On each wheel arm 5, there is provided a lug 7 carrying a pivot bearing for an associated lever 8 extending upwardly. Between a lug 9 on each wheel arm 5 adjacent to its wheel axis and another lug 10 on each associated lever arm 8 there is coupled, by pivot bearing 11 an oleo pneumatic damper 12. Adjacent to the free end of each lever 8 there is provided a pivot 13 serving to complete it respectively to the piston 14 or cylinder 15 of a hydraulic ram. At the extreme end of one lever 8 there is mounted a pivot 16 for a linking arm 17 which is retained generally parallel to the ram. At its free end, the linking arm has a pivoted hooked latch portion 18 loaded by a spring and which can engage with a lug or pin 19 on the free end of the other lever 8. The pivoted latch portion 18 has an extension 18a acted on by a small hydraulic shifting ram 18b to permit raising and lowering of the hook.

In the modification shown in FIG. 3, the linking arm 17 is omitted entirely, and the free end of the ram cylinder 15 is provided with a head 20 having lugs or a radial rim 21. The piston rod 14 of the ram is coupled to a link 22 mounted by a pivot 23 on the free end of the lever 8. The link carries two pivotably mounted latch hooks 24 each having an arm 25 engaged by a compression spring 26 urging the hooks into engagement with the rim or lugs 21. A small hydraulic ram 27 has its piston rod coupled to the arms 25 for moving the hooks outwardly to disengage them when required.

Referring to FIG. 6, the hydraulic circuit comprises a reservoir 28, a pump 29, a control valve 30, and common feed lines 31 to the other ram cylinders 15 (one at each side of the trailer). Another common feed line 32 passes to the respective locking-unlocking rams 18b (FIG. 1) or 27 (FIG. 3). The valve 30 has a control lever 30a which can be set in positions "raise," "neutral" and "lower."

In the "raise" position, pressure fluid is fed to the rams 15 to cause them to shorten, whereby the levers 8 are moved towards each other to raise the chassis 1 with respect to the wheels. When the levers 8 get near to their fully inwards position, the locking means (18, 19 in FIG. 1, or 21, 24 in FIG. 3) ride one over the other and become automatically latched. The control lever 30a is then moved to "neutral" and the tension forces between the levers are taken up by the interconnecting link arms 17. For lowering of the vehicle to the ground, the control lever 30a is moved into "lower" position and causes firstly a momentary further shortening of the interconnecting rams 15, to relieve the forces acting on the locking means, whereafter the ram 18b (FIG. 1) or the ram 27 (FIG. 3) is operated to unlatch the locking means, the interconnecting rams 15 are allowed to exhaust and lengthen to permit movement of the levers 8 apart, until the chassis 1 rests on the ground.

To ensure that the wheel arms 5 move in unison when lifting or lowering the chassis, a resilient torsion bar, disposed for example through a cross tube of the chassis, is coupled to wheel arms at each side and serves also as an anti-roll bar or stabilizer.

Referring to FIG. 4, there is seen an embodiment of trailer having only a single wheel at each side. The arrangement and operation of the trailer is as described above for the embodiment of FIG. 1, but one of the wheel assemblies and its lever arm 8 is replaced by a fixed bracket 33 or any other convenient fixed part of the chassis. For example, the bracket 33 could be omitted, and the ram cylinder 15 and linking arm 17 positioned at an inclination and coupled directly to the chassis 1.

Referring now to FIG. 5, there is seen a third embodiment wherein the lever arms 8 are replaced by leaf springs 8a, and wherein the oleo-dampers 12 are replaced by rigid struts 12a.

The operating ram 14a, 15a is coupled to the ends of the spring arms 8a, but the linking arm 17 and its associated latching mechanism is omitted and the locking function is performed instead by a hermetically closable valve 34 arranged in the feed line to the ram 15a. A suitable hydraulic system is shown in FIG. 7 and includes a reservoir 35, a pump 36 having a handle 36a, and a control valve 37 having a lever 37a with "raise," "neutral" and "lower" positions. The common feed line 38 to each main ram 15a passes through a respective valve 34, and a common control line 39 is connected to each valve 34 for operating it. The arrangement is such that movement of the control lever to "raise" causes pressure to be applied to the main ram 15a to cause it to contract, and pressure is also applied to open the valve 34. When the ram 15a is fully contracted, pressure is removed by moving the control lever to "neutral," which prevents exhausting of the ram 15a, i.e. to "lock" it. When it is desired to lower the trailer, the control lever is moved to "lower" and pressure is applied to the valve 34 to open it, allowing the ram 15a to exhaust.

I claim:
1. A suspension for a vehicle having a chassis comprising a wheel arm positioned longitudinally with respect to the chassis and pivoted at one end to said chassis for vertical movement about an axis lying transversely of the chassis, a wheel journal mounted at the other end of said wheel arm, a wheel mounted on said wheel journal, a lever positioned longitudinally with respect to the chassis and pivoted at one end to said wheel arm for vertical movement about an axis lying transversely of the chassis, a coupling member connected at one end to a point of the wheel arm remote from the transverse axis of the wheel arm and at its other end to a point of the lever remote from the transverse axis of the lever, an anchor element on the chassis, a linking arm connected at one end to said anchor element and releasably connected at its other end to a point of the lever remote from its transverse axis, and a hydraulic ram having one of its ends connected to the anchor element and the other of its ends connected to the lever at a point remote from the transverse axis of the lever, whereby said ram may be used to shift the lever and the wheel arm coupled thereto between raised and lowered end positions about their respective transverse axes, and whereby said linking arm may serve to lock the lever and the wheel arm in their raised end position.

2. A suspension for a vehicle, as claimed in claim 1, wherein the lever is a rigid member and the coupling member is resiliently deformable along its length dimension.

3. A suspension for a vehicle, as claimed in claim 1, wherein the lever is resiliently bendable across its length dimension, and the coupling member is a rigid member.

4. A wheeled suspension for a vehicle having a chassis comprising a first wheel arm positioned longitudinally with respect to the chassis and pivoted at one end to said chassis for vertical movement about an axis lying transversely of the vehicle, a first wheel journal mounted at the other end of said wheel arm, a first wheel mounted on said wheel journal, a first lever positioned longitudinally with respect to the chassis and pivoted at one end to said first wheel arm for vertical movement about an axis lying transversely of the chassis, a first coupling member connected at one end to a point of the first wheel arm remote from the transverse axis of the wheel arm and at its other end to a point of the first lever remote from the transverse axis of the lever, a second wheel arm positioned longitudinally with respect to the chassis and pivoted at one end to said chassis for vertical movement about an axis lying transversely of the vehicle, said second wheel arm extending oppositely longitudinally with respect to said first wheel arm, a second wheel journal mounted at the other end of said second wheel arm, a second lever positioned longitudinally with respect to the chassis and pivoted at one end to said second wheel arm for vertical movement about an axis lying transversely of the chassis, a second coupling member connected at one end to a point of the second wheel arm remote from the transverse axis of said second wheel arm and at its other end to a point of the second lever remote from the transverse axis of said second lever, a linking arm connected at one end of said levers at a point of said lever remote from its transverse axis, said linking arm being releasably connected at its other end to the other of said levers at a point remote from the transverse axis of said other lever, and a hydraulic ram connected at one end to said first lever and at the other end to said second lever, whereby said ram may be used to shift both said levers and the respective wheel arms coupled thereto between respective raised and lowered end positions about their respective transverse axes, and whereby said linking arm may serve to lock the levers and wheel arms in their raised end position.

5. A wheeled suspension for a vehicle having a chassis comprising a first wheel arm positioned longitudinally with respect to the chassis and pivoted at one end to said chassis for vertical movement about an axis lying transversely of the vehicle, a first wheel journal mounted at the other end of said wheel arm, a first wheel mounted on said wheel journal, a first lever positioned longitudinally with respect to the chassis and pivoted at one end to said first wheel arm for vertical movement about an axis lying transversely of the chassis, a first coupling member connected at one end to a point of the first wheel arm remote from the transverse axis of the wheel arm and at its other end to a point of the first lever remote from the transverse axis of the lever, a second wheel arm positioned longitudinally with respect to the chassis and pivoted at one end to said chassis for vertical movement about an axis lying transversely of the vehicle, said second wheel arm extending oppositely longitudinally with respect to said first wheel arm, a second wheel journal mounted at the other end of said second wheel arm, a second wheel mounted on said second wheel journal, a second lever positioned longitudinally with respect to the chassis and pivoted at one end to said second wheel arm for vertical movement about an axis lying transversely of the chassis, a second coupling member connected at one end to a point of the second wheel arm remote from the transverse axis of said second wheel arm and at its other end to a point of the second lever remote from the transverse axis of said second lever, a hydraulic ram connected at one end to one of said levers at a point of said lever remote from its transverse axis, said hydraulic ram being connected at its other end to the other of said levers at a point remote from the transverse axis of said second lever, a hydraulic feed and exhaust circuit for said hydraulic ram, and a hermetically closable valve in said hydraulic circuit, whereby said ram may be used to shift both said levers and the respective wheel arms coupled thereto between respective raised and lowered end positions about their respective transverse axes, and whereby said hermetically sealable valve may be used to lock said ram and thereby lock said levers and associated wheel arms in their raised end position.

6. A wheeled suspension, as claimed in claim 4, wherein said first and second levers are each rigid members, and wherein said first and second coupling members are each resiliently deformable along their length dimension.

7. A wheeled suspension, as claimed in claim 4, wherein said first and second levers are each resiliently bendable across their length dimension, and wherein the said first and second coupling members are each rigid members.

8. A wheeled suspension, as claimed in claim 5, wherein said first and second levers are each rigid members, and wherein said first and second coupling members are each resiliently deformable along their length dimension.

9. A wheeled suspension, as claimed in claim 5, wherein said first and second levers are each resiliently bendable across their length dimension, and wherein the said first and second coupling members are each rigid members.

References Cited
UNITED STATES PATENTS

| | | | |
|---|---|---|---|
| 2,519,002 | 8/1950 | Stemen et al. | 280—43.16 |
| 2,614,863 | 10/1952 | Schramm | 280—43.18 X |
| 2,681,811 | 6/1954 | Green | 280—43.18 X |
| 2,835,400 | 5/1958 | Latzke | 280—43.18 |

BENJAMIN HERSH, *Primary Examiner.*

C. C. PARSONS, *Assistant Examiner.*